(12) United States Patent
Kasahara

(10) Patent No.: US 7,218,136 B2
(45) Date of Patent: May 15, 2007

(54) TRANSMISSION CIRCUIT, DATA TRANSFER CONTROL DEVICE AND ELECTRONIC EQUIPMENT

(75) Inventor: Shoichiro Kasahara, Minowa-cho (JP)

(73) Assignee: Seiko Epson Corporation, Tokyo (JP)

( * ) Notice: Subject to any disclaimer, the term of this patent is extended or adjusted under 35 U.S.C. 154(b) by 89 days.

(21) Appl. No.: 11/129,394

(22) Filed: May 16, 2005

(65) Prior Publication Data

US 2005/0259756 A1 Nov. 24, 2005

(30) Foreign Application Priority Data

May 24, 2004 (JP) .............................. 2004-153654

(51) Int. Cl.
*H03K 17/16* (2006.01)
(52) U.S. Cl. ............................. 326/30; 326/86; 326/90; 327/108
(58) Field of Classification Search .................. 326/30, 326/86, 90; 327/108
See application file for complete search history.

(56) References Cited

U.S. PATENT DOCUMENTS

| 6,578,156 | B1 | 6/2003 | Sugita | |
| 6,586,964 | B1 * | 7/2003 | Kent et al. ..................... | 326/30 |
| 6,597,198 | B2 * | 7/2003 | Haycock et al. .............. | 326/82 |
| 6,664,804 | B2 * | 12/2003 | Nakada et al. ................ | 326/21 |
| 6,707,314 | B2 | 3/2004 | Kasahira et al. | |
| 6,762,619 | B2 * | 7/2004 | Nakada et al. ................ | 326/30 |
| 6,833,738 | B2 * | 12/2004 | Nakada ........................ | 327/58 |
| 6,904,478 | B2 | 6/2005 | Croyle | |

2003/0067325 A1 * 4/2003 Haycock et al. .............. 326/82

FOREIGN PATENT DOCUMENTS

| JP | A-2000-59445 | 2/2000 |
| JP | WO 00/45558 | 8/2000 |
| JP | A-2001-196916 | 7/2001 |
| JP | A-2001-306198 | 11/2001 |
| JP | A-2002-33774 | 1/2002 |
| JP | A-2002-536879 | 10/2002 |
| JP | A-2002-343864 | 11/2002 |
| JP | A-2002-344540 | 11/2002 |
| JP | A 2002-344542 | 11/2002 |
| JP | A-2002-344543 | 11/2002 |

* cited by examiner

*Primary Examiner*—Vibol Tan
(74) *Attorney, Agent, or Firm*—Oliff & Berridge, PLC

(57) ABSTRACT

To provide a transmission circuit which can adequately perform a fast data transmission even to a receiving circuit of a host controller or a device controller with a low sensitivity. A transmission circuit transmitting a signal through first and second signal lines that form a differential pair and includes a first terminating resistor terminating the first signal line, a second terminating resistor terminating the second signal line and a terminating resistance control circuit generating a control signal for controlling terminating resistance values of the first terminating resistor and the second terminating resistor. A first resistor takes a first resistance value if a first control signal is active, a nth resistor takes a nth resistance value if a nth control signal is active, the first-nth resistors are coupled, one end of the coupled first-nth resistors is coupled to a reference potential and the other end is coupled to the first signal line or the second signal line. The terminating resistance control circuit generates the first-nth control signals based on terminating resistance configuration information.

8 Claims, 10 Drawing Sheets

| | FIRST RESISTOR 520 | SECOND RESISTOR 530 | THIRD RESISTOR 540 | FINGER NUMBER 550 | VOH1 (5) 560 | VOH2 (12) 562 | VOH3 (3) 564 | Nch ON 570 | RS 580 | total 590 |
|---|---|---|---|---|---|---|---|---|---|---|
| PATTERN 1 (512) | ○ | ○ | ○ | 20 | 1 | 1 | 1 | 2.4 | 39 | 41.4 |
| PATTERN 2 (514) | ○ | ○ | × | 17 | 1 | 1 | 0 | 2.8 | 39 | 41.8 |
| PATTERN 3 (516) | ○ | × | ○ | 8 | 1 | 0 | 1 | 6.0 | 39 | 45.0 |
| PATTERN 4 (518) | ○ | × | × | 5 | 1 | 0 | 0 | 9.6 | 39 | 48.6 |

FIG. 4

TRANSMISSION CIRCUIT, DATA TRANSFER CONTROL DEVICE AND ELECTRONIC EQUIPMENT

BACKGROUND

The present invention relates to a transmission circuit, a data transfer control device and electronic equipment.

As a data transfer control which uses deferential signals, Universal Serial Bus (USB) standard is known as an interface standard which couples, for example, a personal computer and its peripheral devices. As a demand for a faster data transfer has been recently increased, products that conform to or are compatible with High Speed newly defined in USB 2.0 standard. The USB standard 2.0 can transfer data faster than Low Speed and Full Speed defined in USB 1.1 standard. A data transfer control device and the like that conform to the High Speed newly defined of the USB 2.0 standard are variously designed to perform an appropriate data transfer (see Patent Document 1).

As for the Low Speed and the Full Speed defined in the USB 1.1 standard or the USB 2.0 standard, for example, even if a device controller that sends data or a host controller is not exactly made to conform to the USB 1.1 standard, the host controller can often properly receive or transfer data because a data transfer rate is low. Therefore, few problems occur when the data transfer in the Low Speed and the Full Speed defined in the USB 1.1 standard or the USB 2.0 standard is performed with the products that do not exactly follow designing requirements of the USB 1.1 standard.

However, as for the High Speed newly defined in the USB 2.0 standard, when a device which sends data to a receiving circuit of the host controller that receives data is not made so as to conform to designing requirements of the USB 2.0 standard, the data could not sometimes be transferred properly even if the transmitted data waveform is complied with the standard. This is because a theoretical value of the data transfer rate of the High Speed is 480 Mbps, which is very fast. Nevertheless, such products that do not exactly follow the designing requirements of the USB 2.0 standard exist in the market.

For example, when the host controller that receives data is not made so as to follow the designing requirements defined in the standard, even if the device controller is made to properly conforms to the designing requirements and sends a signal having a wave form that complies with the standard, the data transfer could not be properly performed sometimes.

Correspondingly, when the device controller that receives data is not made so as to follow the designing requirements defined in the standard, even if the host controller is made so as to properly conforms to the designing requirements and sends a signal having a wave form that comply with the standard, the data transfer could not be properly performed sometimes.

[Patent Document 1] Japanese Unexamined Patent Publication No. 2002-344542.

The present invention has been developed in consideration of the above-mentioned problems, and intended to provide a transmission circuit which can adequately perform a fast data transmission even to a host controller and a device controller which are not made to exactly follow designing requirements defined by standards. The present invention is also intended to provide a data transfer control device and electronic equipment.

SUMMARY (1) A transmission circuit of an aspect of the present invention transmits a signal through first and second signal lines that form a differential pair and includes a current source coupled between a first power supply and a node, a first switching element inserted between the node and the first signal line, a second switching element inserted between the node and the second signal line and a circuit driving the first signal line or the second signal line though either the first switching element or the second switching element with a current provided from the current source. The transmission circuit further includes
a first terminating resistor terminating the first signal line, a second terminating resistor terminating the second signal line and a terminating resistance control circuit generating a control signal for controlling terminating resistance values of the first terminating resistor and the second terminating resistor. In the transmission circuit, the first terminating resistor and the second terminating resistor respectively have a variable resistor including first-nth resistors coupled each other, the first resistor takes a first resistance value if a first control signal is active, the nth resistor takes a nth resistance value if a nth control signal is active, one end of the coupled first-nth resistors is coupled to a reference potential, the other end of the coupled first-nth resistors is coupled to the first signal line or the second signal line and the terminating resistance control circuit generates the first-nth control signals based on a terminating resistance configuration information.

When the first signal line and the second signal line are driven by current, the current from the current source is provided to a predetermined node in the transmission circuit. At the same time, the first switching element and the second switching element coupled to the node are exclusively controlled and the current is supplied to a selected signal line.

In the transmission circuit, the current source is preferably a constant current source.

The terminating resistance of the terminating resistor is decided according to a combination of resistance of activated resistors out of the first-nth resistors.

For example, when the first resistor, the second resistor and the third resistor are active, the resistance value is a resistance consists of the first resistance, the second resistance and the third resistance coupled in parallel.

In this way, according to the present invention, a plurality of terminating resistance patterns can be set according to an active/inactive combination of the first resistor through the nth resistor.

The terminating resistance configuration information is information which can be externally set by, for example, users or designers and specifies a selected resistance value from a range of the configurable terminating resistance values set by the terminating resistor.

The active/inactive combination of the first resistor through the nth resistor is decided based on the terminating resistance configuration information. Therefore, the plurality of terminating resistance patterns can be set by changing the terminating resistance information.

Generally, the opener the waveform becomes (the better a through-rate is), the more easily the signal can be received (the larger an area bounded by the waveform becomes) and there is a high probability that even a receiving device with a low sensitivity can receive the signal.

The maximum amplitude (a voltage level) of the waveform is a factor to increase the area bounded by the waveform. The maximum amplitude is decided by a current value and a resistance value of a first signal and a second signal. For example, when a stationary current source is used, the maximum amplitude mostly depends on the resistance value of the terminating resistor and the like. Therefore, the maximum amplitude of the waveform can be changed by changing the configuration of the terminating resistance.

According to the invention, the terminating resistance can be changed by changing the terminating resistance configuration information and an output waveform of the transmission circuit can be adjusted. Therefore, even if a receiving circuit of a host controller or a device controller is not exactly made to conform to a given specification, the data transfer using the differential signal can be properly conducted. Furthermore, better communication environment can be set by selecting an appropriate terminating resistance according to the characteristics (reception and the like) of the receiving device which can be assumed from the plurality of selectable terminating resistance values. For example, if the destination is the receiving device with the low sensitivity, a higher terminating resistance is selected and set, and then the chance to receive the signal can be increased.

In the transmission circuit, a plurality of the terminating resistance values including the specified value of 45 in the USB standard, an approximate value of the specified minimum value in the standard and an approximate value of the specified maximum value in the standard may be set in order to cover the specified terminating resistance range of 45 +/−10% in the USB standard by changing the active/inactive combination of the first resistor through the nth resistor.

(2) The transmission circuit may further include a first fixed resistor coupled in series with the first terminating resistor and terminating the first signal line and a second fixed resistor coupled in series with the second terminating resistor and terminating the second signal line.

Here, the fixed resistor may be made as a diffused resistor (for example, N-type diffused resistor). In this way, a stable resistance which will not be affected by a difference in characteristics can be obtained.

For example, when the variable resistor is made so as to cover the specified terminating resistance range of 45 +/−10% in the USB standard, the fixed resistance may be about the specified minimum value (terminating resistance 45×0.9) in the standard.

(3) In the transmission circuit, the first-nth resistors forming the variable resistor may respectively include a one or more than one N-type MOS transistor elements that are couple in parallel, and control signals corresponding to first-nth control signals may be correspondingly coupled to gates of the N-type MOS transistor elements in the first-nth resistors.

(4) The transmission circuit preferably further includes a low speed transmission circuit including a first driver driving the first signal line and a second driver driving the second signal line. And the first fixed resistor is preferably provided between the first driver and the first signal line, the second fixed resistor is preferably provided between the second driver and the second signal line, and outputs of the first driver and the second driver are preferably fixed to a first level (for example, L level) in a case of a fast transmission.

The transmission circuit is a transmission device including a high speed transmission circuit (for example, HS mode of the USB) and a low speed transmission circuit (for example, FS mode of the USB).

In this way, the fixed resistor can serve as a dumping resistor at the time of a low speed transmission (for example, the FS mode of the USB). At the time of a high speed transmission (for example, the HS mode of the USB), the fixed resistor can serve as the terminating resistor and terminate the first and second signal lines.

According to the invention, it is possible to make a circuit scale smaller because the first terminating resistor and the second terminating resistor are commonly used in the low speed transmission and the high speed transmission.

(5) In the transmission circuit, the terminating resistance control circuit preferably includes a terminating resistance information register storing the terminating resistance information that is possible to be set by an external input.

(6) In the transmission circuit, the signal transmitted through the first and second signal lines forming the differential pair is preferably a signal specified in Universal-Serial-Bus standard.

(7) A data transfer control device of the present invention includes a circuit conducting a predetermined transmission process and the above-described transmission circuit transmitting a signal based on the predetermined transmission process.

(8) Electronic equipment of the present invention includes the above-described data transfer control device and a device performing an output process, a loading process and a storing process of data that is transferred through a bus and the data transfer control device.

BRIEF DESCRIPTION OF THE DRAWINGS

FIG. 4 is an explanatory drawing for a pattern of a terminating resistance which the embodiment can provide;

DETAILED DESCRIPTION OF EMBODIMENTS

Embodiments of the present invention will now be described in detail with reference to the accompanying drawings. Embodiments described hereunder shall not limit the scope of the present invention which is described in claims. Also, all of components described in the embodiments below are not necessarily essential to the means of the present invention.

1. USB 2.0

In the USB 2.0, a transfer mode called a High Speed mode is newly defined in addition to the Low Speed mode and the Full Speed mode defined in the USB 1.1. Data is transferred at the theoretical value of the rate of 480 Mbps in the High Speed mode. A plurality of peripheral devices (hereinafter, also called as devices) compliant with the USB standards have device controllers and can be connected to a personal computer (hereinafter, also called as a host) having a host controller which manages a bus through the bus. A hub device may be provided between a peripheral device and the personal computer.

The host controller compliant with the USB 2.0 is installed in such device controller and host controller. The device controller and the host controller judge whether the host controller installed in the connected personal computer through the bus is compliant with the High Speed mode defined in the USB 2.0 or not and controls data transfer through the bus. The device controller and the host controller also judge whether the device controller installed in the connected peripheral device through the bus is compliant with the High Speed mode defined in the USB 2.0 or not and controls data transfer through the bus.

When the host controller and the device controller are coupled through, for example, the hub device having a hub controller compliant with the High Speed mode defined in the USB 2.0, the hub controller judges whether the host controller installed in the connected personal computer and the device controller installed in the connected peripheral device are compliant with the High Speed mode defined in the USB 2.0 or not and controls a bus transfer mode.

A transmission circuit according to the present invention may be applied to transmission circuits included in a physical layer circuit of the device controller or the host controller which performs data transfer in the High Speed mode defined by the USB 2.0, for example. The transmission circuit according to the present invention is not limited to the application for the data transfer control devices conforming to the USB 2.0 insofar as the transmission circuit transmits a signal by driving current.

2. First Embodiment of Transmission Circuit

Figure 1:
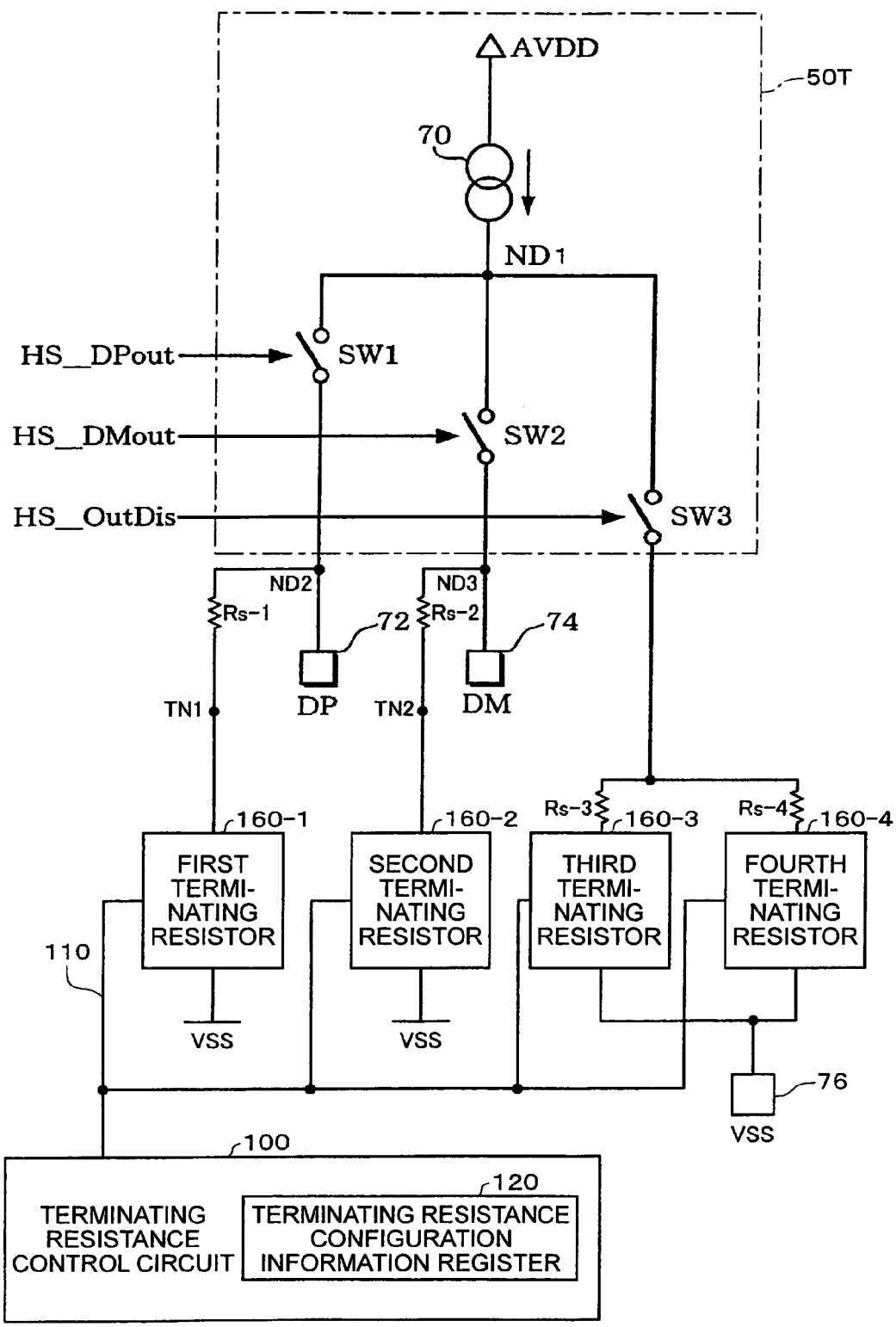
FIG. 1 is a circuit diagram showing a transmission circuit of an embodiment.

FIG. 1 is a circuit diagram of a transmission circuit 50 that sends a differential signal through a first signal line and a second signal line which form a differential pair. In the following figures, components are given the identical numerals. The transmission circuit 50 can send a differential signal that corresponds to an interface standard (for example, the High Speed defined by the USB 2.0) in which the data transfer is performed by using the differential signal.

When the differential signal is transmitted by the transmission circuit 50, the first signal line is coupled to a DP terminal 72 in the transmission circuit 50 and the second signal line is coupled to a DM terminal 74 in the transmission circuit 50.

The transmission circuit 50 includes a constant current source 70, a transistor SW1 (a first transistor in a broad sense), a transistor SW2 (a second transistor in a broad sense) and a transistor SW3. The constant current source 70 is coupled to a first power supply VDD and a node ND1. One end of the each transistor is coupled to the node ND1. The other end of the transistor SW1 is coupled to the DP terminal 72 and the other end of the transistor SW2 is coupled to the DM terminal 74. The other end of the transistor SW3 is coupled to a VSS terminal 76 through terminating resistors (a third terminating resistor 60-3 and a fourth terminating resistor 60-4 coupled each other in parallel). The VSS terminal is coupled to a second power supply VSS (not shown in the figure) which supplies a lower voltage than the voltage which the first power supply VDD supplies.

Here, when a signal HS_DPout is set to be active, a signal HS_DMout is set to be inactive. On the contrary, when the signal HS_DPout is set to be inactive, the signal HS_DMout is set to be active.

As described above, the signal HS_DPout and the signal HS_DMout whose active and inactive states are controlled exclusively are respectively outputted to the gates of the transistor SW1 and the transistor SW2.

For example, when the HS_DPout is active, the HS_DMout is set to be inactive. Therefore, the transistor SW1 becomes an ON state and the transistor SW2 becomes an OFF state. By doing this, the DP terminal 72 and the constant current source 70 are electrically coupled.

On the contrary, when the HS_DPout is inactive, the HS_DMout is set to be inactive. Therefore, the transistor SW1 becomes the OFF state and the transistor SW2 becomes the ON state. By doing this, the DM terminal 74 and the constant current source 70 are electrically coupled.

In this way, current running through the DP terminal 72 and the DM terminal 74 can be controlled by exclusively controlling the transistor SW1 and the transistor SW2. Accordingly, the differential signal can be generated at the DP terminal 72 and the DM terminal 74

In this embodiment, a first terminating resistor 160-1 is coupled to a node ND2 between the SW1 and the DP terminal 72. The first signal line is terminated at a resistance value of the first terminating resistor 160-1. Furthermore, a fixed resistor Rs-1 may be provided between the node ND2 and the terminating resistor 160-1. The fixed resistor Rs-1 may be provided between the terminating resistor 160-1 and the Vss.

Figures 8A, 8B:
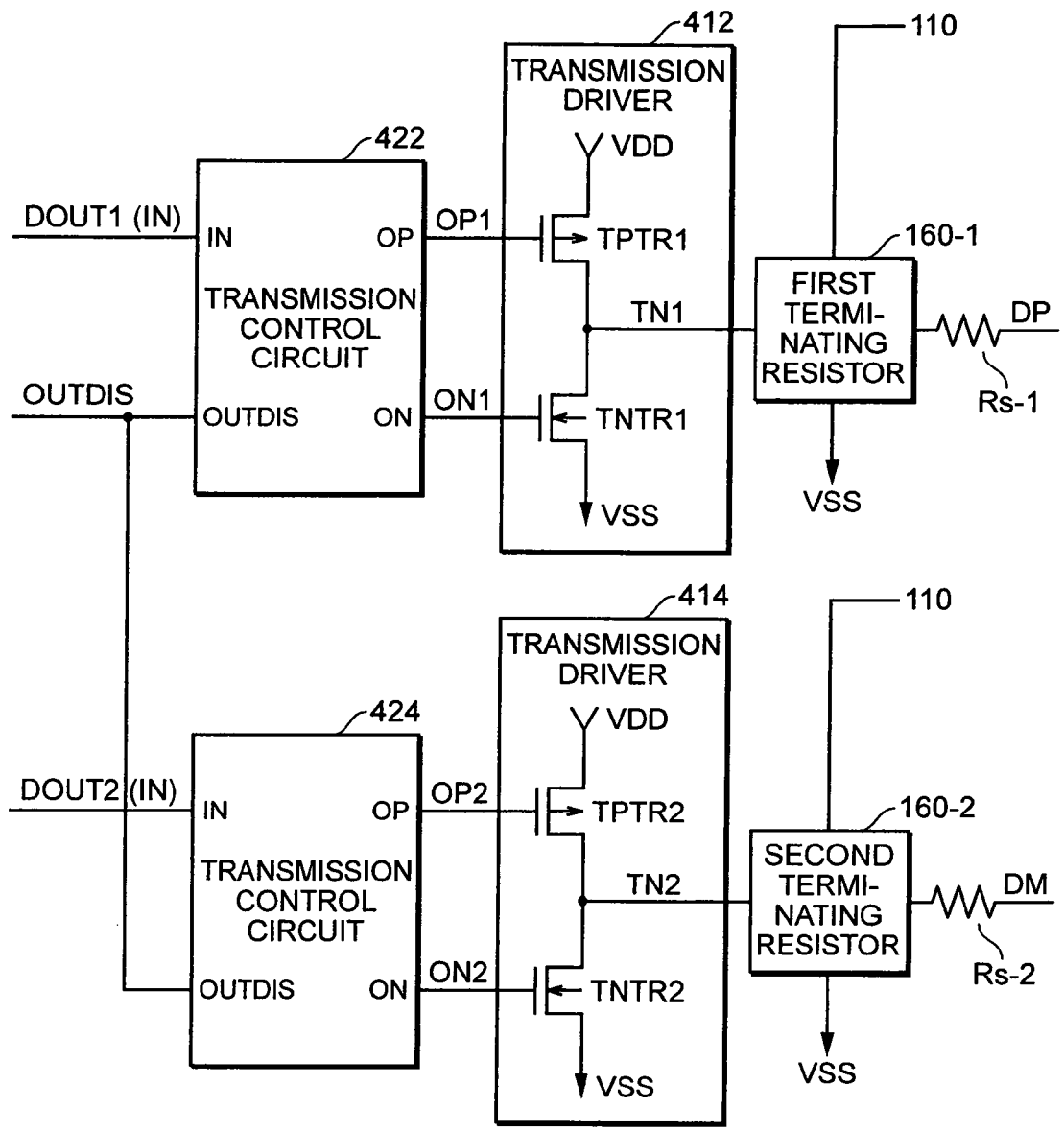
FIG. 8A shows a specific configuration example of the transmission circuit.
FIG. 8B shows a specific example of a truth table.

Here, a node TN 1 between the fixed resistor Rs-1 and the first terminating resistor 160-1 corresponds to TN1 in FIG. 8A.

A second terminating resistor 160-2 is coupled to a node ND3 between the SW2 and the DM terminal 74. The second signal line is terminated at a resistance value of the terminating resistor 160-2. Furthermore, a fixed resistor Rs-2 may be provided between the node ND3 and the terminating resistor 160-2. The fixed resistor Rs-2 may be provided between the terminating resistor 160-2 and the Vss.

Here, a node TN 2 between the fixed resistor Rs-2 and the second terminating resistor 160-2 corresponds to TN2 in FIG. 8A.

In this embodiment, a terminating resistance control circuit 100 generating a control signal to control a terminating resistance value of the first terminating resistor 160-1 and the second terminating resistor 160-2 is also provided. The terminating resistance control circuit 100 generates a control signal 110 (consists of a plurality of control signals) according to configuration information of the terminating resistance which is set in a terminating resistance configuration information register 120.

A plurality of different terminating resistance values can be set in the first terminating resistor 160-1 and the second terminating resistor 160-2. The first terminating resistor 160-1 and the second terminating resistor 160-2 switch over the terminating resistance values according to the control signal 110 (consists of the plurality of control signals).

Figure 2:
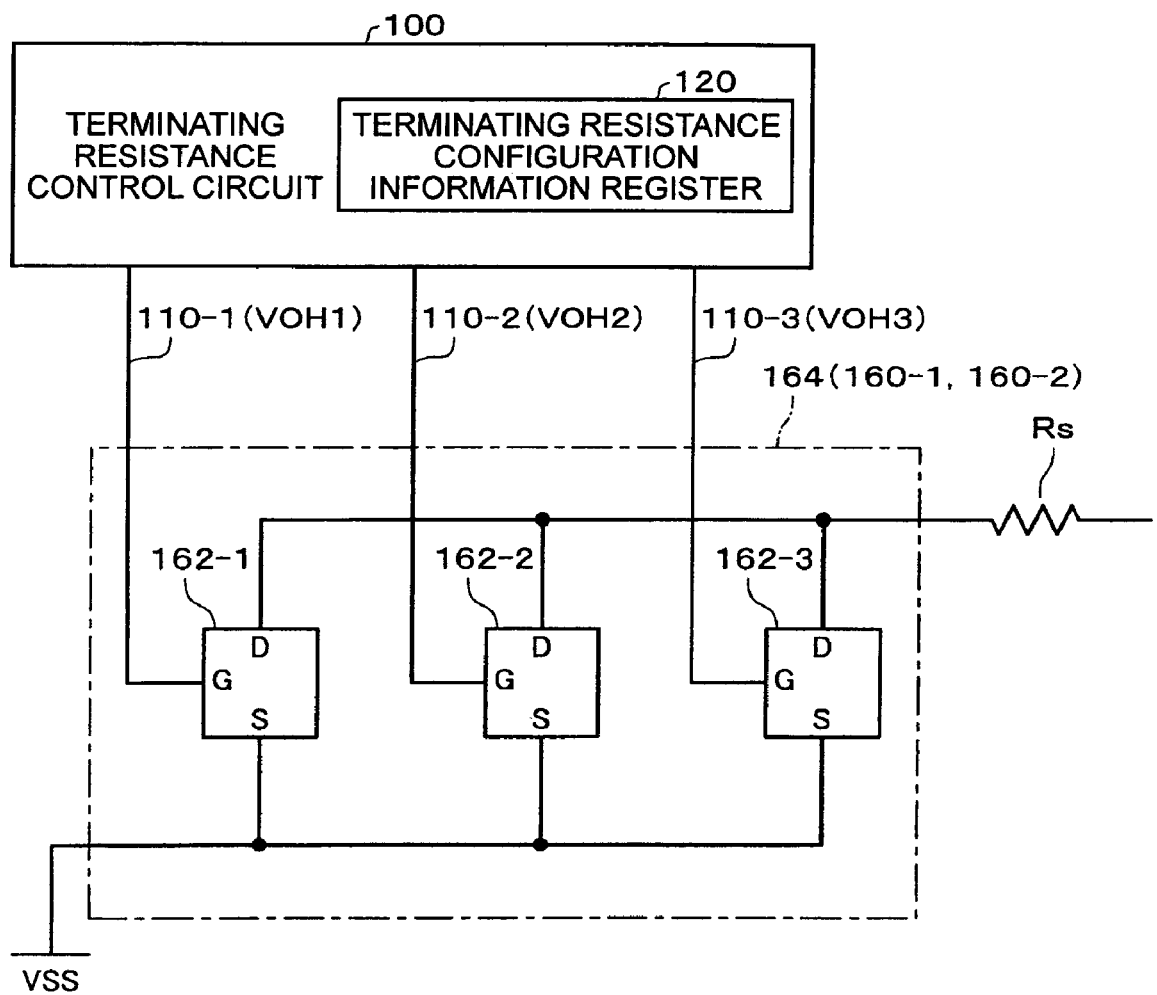
FIG. 2 shows a structure of a first terminating resistor and a second terminating resistor of the embodiment.

FIG. 2 shows a structure of the first terminating resistor and the second terminating resistor.

The first terminating resistor 160-1 and the second terminating resistor 160-2 respectively include a variable resistor 164 that has a first resistor 162-1, a second resistor 162-2 and a third resistor 162-3 (here, n=3) which are coupled in parallel. The resistance of the first resistor 162-1 becomes a first resistance value when a first control signal (VOH1) 110-1 is active. The resistance of the second resistor 162-2 becomes a second resistance value when a second control signal (VOH2) 110-2 is active. The resistance of the third resistor 162-3 becomes a third resistance value when a third control signal (VOH3) 110-3 is active.

The first resistor 162-1, the second resistor 162-2 and the third resistor 162-3 which compose the variable resistor 164 are respectively controlled to be active or inactive by the corresponding control signals 110-1 (VOH1), 110-2 (VOH2) and 110-3 (VOH3) which are generated by the terminating resistance control circuit 100. The terminating resistance is determined by a resistance value of activated circuits out of these resistors coupled in parallel.

The first signal line and the second signal line are terminated through the fixed resistors Rs serially coupled to the first terminating resistor 160-1 and the second terminating resistor 160-2. The fixed resistor Rs is made as a diffused resistor (for example, N-type diffused resistor). The resistance value of the fixed resistor Rs can be large and a stable resistance value can be obtained by using the N (+)-type diffused resistor.

As described above, according to this embodiment, a plurality of terminating resistance patterns can be set according to an active/inactive combination of the first resistor through the nth resistor.

Furthermore, the terminating resistance configuration information can be set by, for example, users or designers from outside and specifies a selected resistance value from a range of the configurable terminating resistance values set by the terminating resistor.

The active/inactive combination of the first resistor through the nth resistor is decided based on the terminating resistance configuration information. Therefore, the plurality of terminating resistance patterns can be changed by changing the terminating resistance information.

Figure 3A:
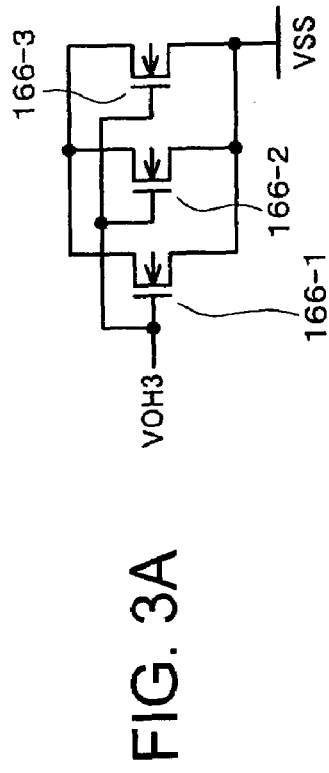
FIGS. 3A though 3C show configuration examples of resistors that form a variable resistor.
Figure 3B:
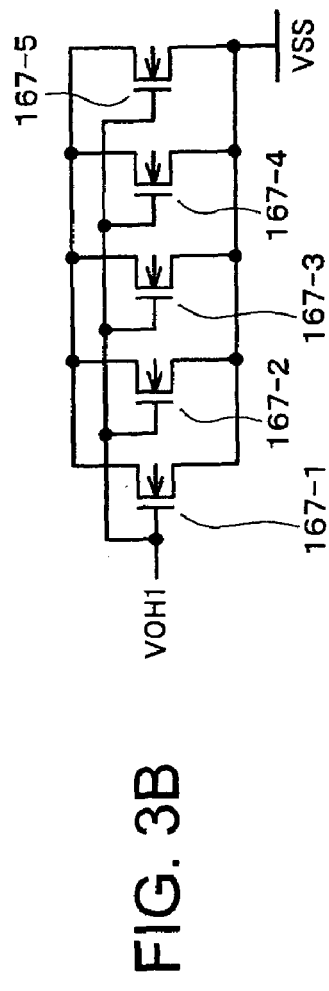
Figure 3C:
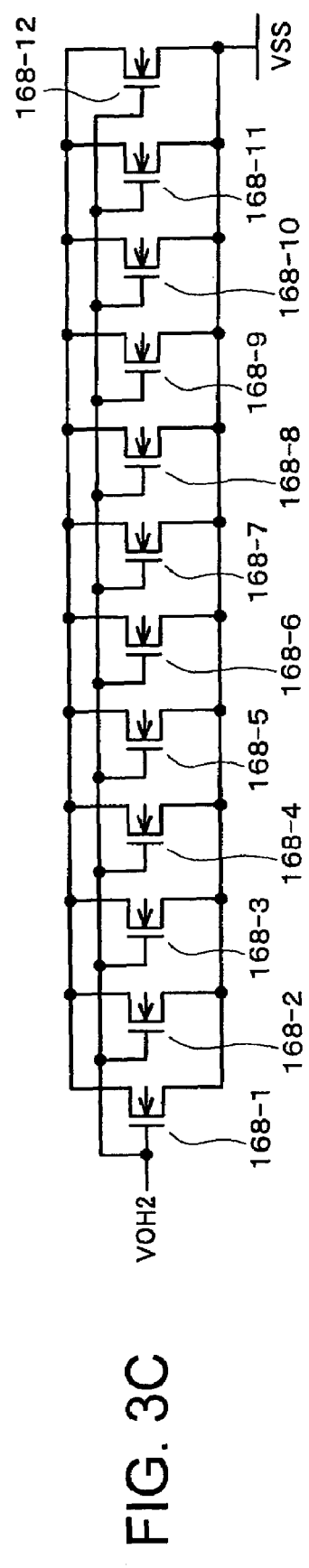

FIGS. 3A through 3C show a configuration example of the resistor which forms the variable resistor.

The variable resistor in this embodiment is made of, for example, a single or a plurality of N-type metal-oxide semiconductor (MOS) transistors coupled in parallel and the control signal line is coupled to the gate of each MOS transistor element as shown FIGS. 3A through 3C.

An example of the resistor in which three NMOS transistor elements 166-1 through 166-3 are coupled in parallel and the control signal line (VOH3) is coupled to the gate of each element is shown in FIG. 3A. When the control signal (VOH3) becomes active (H-level), the gates of the MOS transistor elements 166-1 through 166-3 become the ON state and the three NMOS transistor elements (resistors) are coupled in parallel.

An example of the resistor in which five NMOS transistor elements 167-1 through 167-5 are coupled in parallel and the control signal (VOH1) is coupled to the gate of each element is shown in FIG. 3B. When the control signal (VOH1) becomes active (H-level), the gates of the MOS transistor elements 167-1 through 167-5 become the ON state and the five NMOS transistor elements (resistors) are coupled in parallel.

An example of the resistor in which twelve NMOS transistor elements 168-1 through 168-12 are coupled in parallel and the control signal (VOH2) is coupled to the gate of each element is shown in FIG. 3C. When the control signal (VOH2) becomes active (H-level), the gates of the MOS transistor elements 168-1 through 168-12 become ON state and the twelve NMOS transistor elements (resistors) are coupled in parallel.

FIG. 4 is an explanatory drawing for a terminating resistance pattern which this embodiment can provide.

Here, an example of the terminating resistance pattern which consists of the terminating resistor made of the three resistors (the first resistor 162-1, the second resistor 162-2 and the third resistor 162-3) and the fixed resistor Rs as shown in FIG. 2 will be explained.

The first resistor 162-1 has the five NMOS transistor elements coupled in parallel as shown in FIG. 3B and is controlled to be ON/OFF by the control signal (VOH1) 110-1.

The second resistor 162-2 has the twelve NMOS transistor elements coupled in parallel as shown in FIG. 3C and is controlled to be ON/OFF by the control signal (VOH2) 110-2.

The third resistor 162-3 has the three NMOS transistor elements coupled in parallel as shown in FIG. 3A and is controlled to be ON/OFF by the control signal (VOH3) 110-3.

Pattern 1 (see reference number 512) is a combination in which the VOH1 (see reference number 516), the VOH2 (see 562) and the VOH3 (see 546) are all ON state and the first resistor (see 520), the second resistor (see 530) and the third resistor (see 540) are all active. In this case, the variable resistor is made of twenty NMOS transistor elements coupled in parallel and its resistance is 2.4 Ω (see 570). A resistance value of the fixed resistor is 39 Ω (see 580) so that the terminating resistance value is 41.4 Ω (see 590).

Pattern 2 is a combination in which the VOH1 and the VOH2 are ON state, the VOH3 is OFF state and the first resistor and the second resistor are active. In this case, the variable resistor is made of seventeen NMOS transistor elements coupled in parallel and its resistance is 2.8 Ω. The resistance value of the fixed resistor is 39 Ω so that the terminating resistance value is 41.8 Ω.

Pattern 3 is a combination in which the VOH1 and the VOH3 are ON state, the VOH2 is OFF state and the first resistor and the third resistor are active. In this case, the variable resistor is made of eight NMOS transistor elements coupled in parallel and its resistance is 6.0 Ω. The resistance value of the fixed resistor is 39 Ω so that the terminating resistance value is 45.0 Ω (specified value of the USB 2.0).

Pattern 4 is a combination in which the VOH1 is ON state, the VOH2 and the VOH3 are ON state and only the first resistor is active. In this case, the variable resistor is made of five NMOS transistor elements coupled in parallel and its resistance is 9.6 Ω. The resistance value of the fixed resistor is 39 Ω so that the terminating resistance value is 48.6 Ω.

As described above, in this embodiment, the combination of the active resistors can be changed by controlling the ON/OFF of each control signal. Accordingly, the resistance of the variable resistor can be changed and a plurality of the terminating resistance patterns can be created.

In the above-described embodiment, it is possible to set a plurality of the terminating resistance values including 45 Ω which is the specified value in the standard, 41.4 Ω which is approximate to the specified minimum value in the standard and 48.6 Ω which is approximate to the specified maximum value in the standard in order to cover the specified range of 45+/−10% in the USB standard.

In this way, the plurality of the terminating resistance patterns can be provided in order to cover the specified range of 45+/−10% in the USB standard. Therefore, it is possible to provide a versatile transmission device which can be selected according to characteristics of each product and the like.

Figure 5:
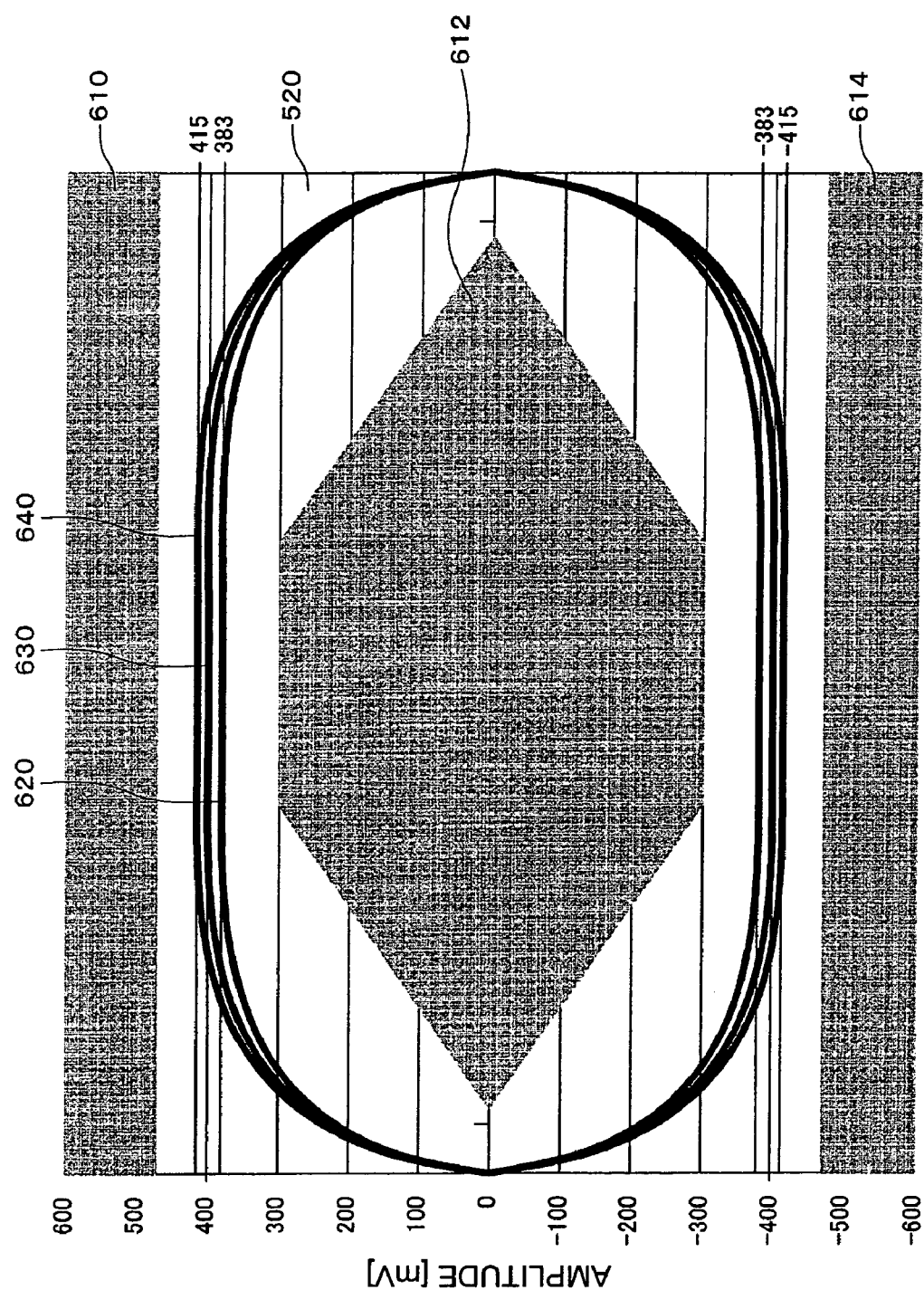
FIG. 5 is a figure for explaining about a terminating resistance characteristic and a differential signal characteristic.

FIG. 5 is a figure for explaining about the terminating resistance and differential signal characteristics (a signal characteristic or Eye Pattern of the DP and the DM).

Upper and lower zonal areas 610 and 614 and a hexagonal area 612 in the figure are interdiction areas specified by the USB standard. It is decided in the standard that the wave forms of the DP and the DM should be designed to have a signal characteristic which will not enter this interdiction area.

The reference number 620 designates the signal characteristic (the eye pattern) of the DP and DM when the terminating resistance is 48.6 Ω (Pattern 4 in FIG. 4). The reference number 630 denotes the signal characteristic of the DP and DM when the terminating resistance is 45.0 Ω (Pattern 3 in FIG. 4). The reference number 640 designates the signal characteristic of the DP and DM when the terminating resistance is 41.4 Ω (Pattern 1 in FIG. 4). A wave 620 has a maximum amplitude of approximately +415 mV, a wave 630 has a maximum amplitude of approximately ±400 mV and a wave 640 has a maximum amplitude of approximately ±383 mV.

Generally, the opener the waveform becomes (the better a through-rate is), the more easily the signal can be received (the larger an area bounded by the waveform becomes) and there is a high probability that even a receiving device with a low sensitivity can receive the signal.

As a factor to increase the area bounded by the waveform, there are an inclination and the maximum amplitude (a voltage level) of the waveform. The maximum amplitude is decided by a current value and a resistance value of the DP and the DM. Here, a stationary current source is used so that the maximum amplitude mostly depends on the resistance value of the terminating resistor and the like. Therefore, the maximum amplitude of the waveform can be changed by changing the configuration of the terminating resistance.

According to the embodiment, the terminating resistance can be changed by changing the terminating resistance configuration information. Therefore, better communication environment can be set by selecting an appropriate terminating resistance according to the characteristics (reception and the like) of the receiving device which can be assumed from the plurality of selectable terminating resistance values. For example, if the destination is the receiving device with the low sensitivity, a higher terminating resistance is selected and set, and then the chance to receive the signal can be increased.

3. Second Embodiment of Transmission Circuit and Data Transfer Control Device

Next, structures of the transmission circuit of a second embodiment and a data transfer control device will be described. In this embodiment, the transmission circuit further including a transmission circuit for a lower speed transmission. The transmission circuit and the transmission circuit for the lower speed transmission share the terminating resistor.

Figure 6:
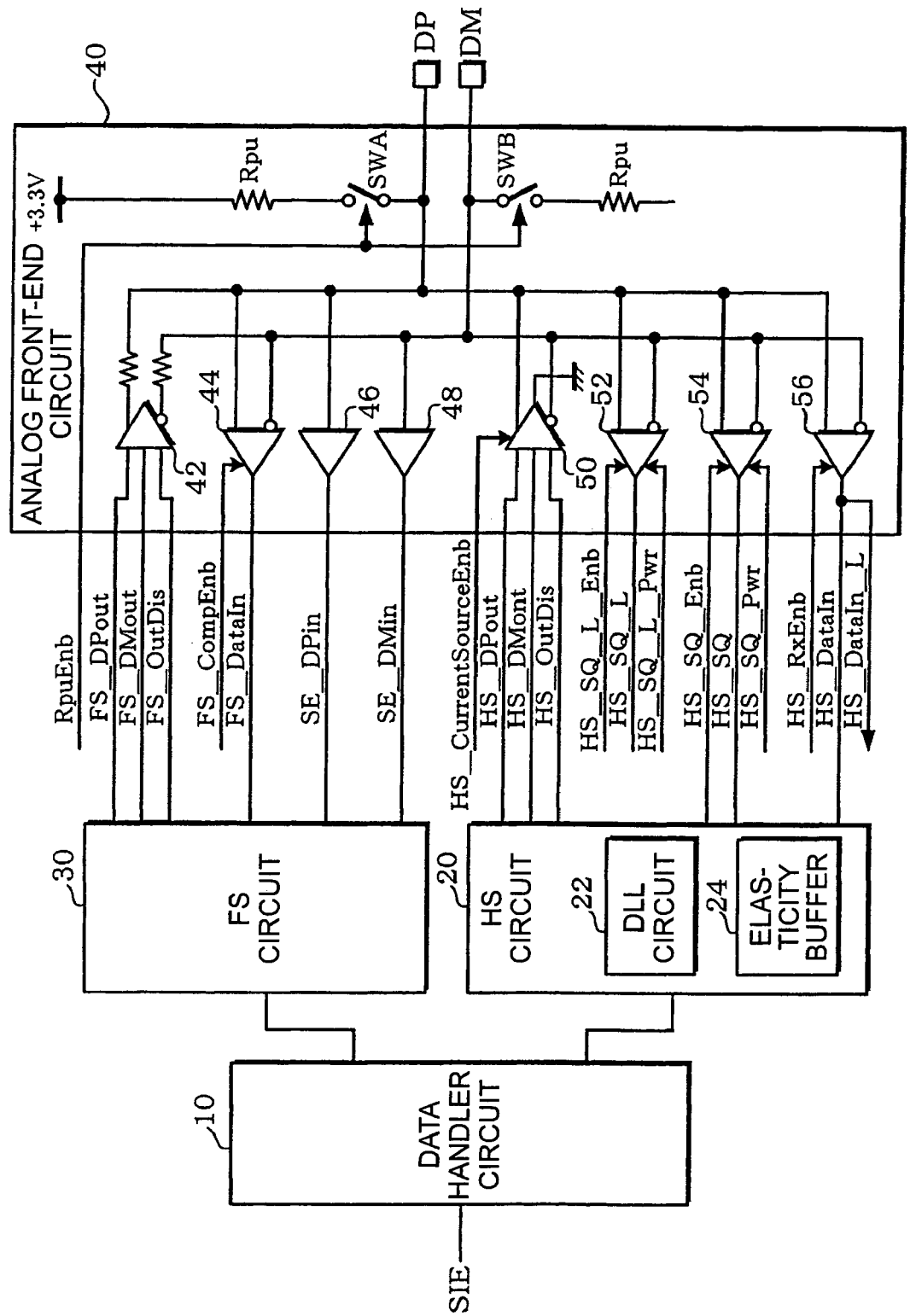
FIG. 6 is an example of a structure of a data transfer control device to which the transmission circuit of a second embodiment is applied.

FIG. 6 is another example of a structure of the data transfer control device to which the transmission circuit of the second embodiment is applied.

This data transfer control device includes a logical layer circuit and the physical layer circuit.

The logical layer circuit includes a data handler circuit 10, a High Speed (HS) circuit 20, and a Full Speed (FS) circuit 30. The physical layer circuit includes an analog front-end circuit 40. The data transfer control device does not necessary include all the circuit blocks shown in FIG. 1. Some of the circuit blocks may be omitted.

The data handler circuit 10 (given circuit for transferring data in a broad sense) performs various types of transmission processes and reception processing for data transfer defined in the USB 2.0. More specifically, the data handler circuit performs processes to add SYN Chronization (SYNC), Start of Packet (SOP) and End of Packet (EOP) to the transmit data, a bit stuffing process and the like at the time of data transmission. At the time of data reception, the data handler circuit performs processes to detect and delete the SYNC, SOP, and EOP of the receive data, a bit unstuffing processes and the like. The data handler circuit 10 also performs a process to generate various types of timing signals for controlling transmission and reception of data. Such data handler circuit 10 is coupled to a serial interface engine (SIE).

The SIE includes SIE control logic for identifying a USB packet ID and address, and endpoint logic for performing endpoint process such as identification of an endpoint number and FIFO control.

The HS circuit 20 is a logic circuit to send and receive data in the High Speed (HS) mode in which the data transfer rate is 480 Mbps.

The FS circuit 30 is a logic circuit to send and receive data in the Full Speed (FS) mode in which the data transfer rate is 12 Mbps.

The analog front-end circuit 40 is an analog circuit including drivers and receivers for transmitting and receiving data in the FS mode and the HS mode. In the USB, data is transmitted and received by a differential pair of signals using the DP (Data+) and the DM (Data−).

This data transfer control device further includes a clock circuit (not shown in the figures) for generating a clock signal at 480 MHz used in the HS circuit 20 and a clock signal at 60 MHz used in the device and the SIE. The data transfer control device also includes a control circuit (not shown in the figures) for generating various types of control signals of the analog front-end circuit 40.

The HS circuit 20 includes a Delay Line PLL (DLL) circuit 22 and an elasticity buffer 24.

The DLL circuit 22 generates a data sampling clock based on a clock generated by an unshown clock circuit and a received signal.

The elasticity buffer 24 is a circuit for absorbing the difference in clock frequency (clock drift) between inside the device and external devices (external devices coupled to the bus) and the like.

The USB 2.0 defines the HS mode and the FS mode as the transfer modes. The HS mode is additionally defined in the USB 2.0. The FS mode has been defined in the USB 1.1.

In the HS mode, data is transmitted and received between the data handler circuit 10 and the analog front-end circuit 40 through the HS circuit 20.

In the FS mode, data is transmitted and received between the data handler circuit 10 and the analog front-end circuit 40 through the FS circuit 30.

Therefore, the analog front-end circuit 40 has a FS-mode driver and receiver for transmitting and receiving the DP and DM, which are the differential pair of the send and receive signals, in the FS mode in addition to a HS-mode driver and receiver for transmitting and receiving the DP and DM.

More specifically, the analog front-end circuit 40 includes an FS driver 42, an FS differential data receiver 44, a Single Ended (SE)_DP receiver 46, an SE_DM receiver 48, an HS current driver 50 (transmission circuit in a broad sense), a low-speed HS_SQ (SQuelch)_L circuit 52, a high-speed HS_SQ circuit 54 and an HS differential data receiver 56.

In the FS mode, the FS driver 42 outputs a differential pair of send signals consisting of FS_DPout and FS_DMout sent from the FS circuit 30 as the differential pair of signals consisting of the DP and DM. The output of the FS driver 42 is controlled by FS_OutDis from the FS circuit 30.

The FS differential data receiver 44 amplifies the differential pair of received signals DP and DM and outputs it as FS_DataInto to the FS circuit 30 in the FS mode. The amplification of the FS differential data receiver 44 is controlled by FS_CompEnb.

The SE_DP receiver 46 amplifies the received signal DP, which is single-ended, and outputs it as SE_DPin to the FS circuit 30 in the FS mode.

The SE_DM receiver 48 amplifies the received single ended signal DM and outputs it as SE_DMin to the FS circuit 30 in the FS mode.

In the HS mode, the HS current driver 50 amplifies the differential pair of send signals the HS_DPout and the HS_DMout sent from the HS circuit 20 and outputs it as the differential pair of send signals consisting of the DP and DM. The output of the HS current driver 50 is controlled by HS_OutDis from the HS circuit 20. The drive current of the HS current driver 50 is controlled by HS CurrentSourceEnb.

The low-speed HS_SQ_L circuit 52 precisely detects the presence or absence of the differential pair of the received signals DP and DM and outputs HS_SQ_L as the signal detection results. The operation of the low-speed HS_SQ_L circuit 52 is controlled by HS_SQ_L_Enb. The power consumption of the low-speed HS_SQ_L circuit 52 is controlled by HS_SQ_L_Pwr.

In the HS mode, the high-speed HS_SQ circuit 54 detects the presence or absence of the differential pair of the received signals DP and DM and outputs HS_SQ to the HS circuit 20 as the signal detection results. The operation of the high-speed HS_SQ circuit 54 is controlled by HS_SQ_Enb sent from the HS circuit 20. The power consumption of the high-speed HS_SQ circuit 54 is controlled by HS_SQ_Pwr.

The HS differential data receiver 56 amplifies the differential pair of the received signals DP and DM and outputs HS_DataIn and HS_DataIn_L in the HS mode. The amplification of the HS differential data receiver 56 is controlled by HS_RxEnb.

The DP of the differential pair of the transmission and reception signals DP and DM is (electrically) coupled to a power supply voltage of 3.3 V through an SWA and a pull-up resistor Rpu. The DM of the differential pair of the transmission and received signals is coupled to an SWB. The SWA and SWB are controlled by RpuEnb. Taking the load balance into consideration, the DM may be coupled to a resistance equivalent to the pull-up resistor Rpu through the SWB. The RpuEnb at least allows the DP to be coupled to the pull-up resistor Rpu through the SWA in the FS mode.

The data transfer control device includes the drivers and receivers corresponding to the transfer rates in the HS mode and the FS mode as described above.

Figure 7:
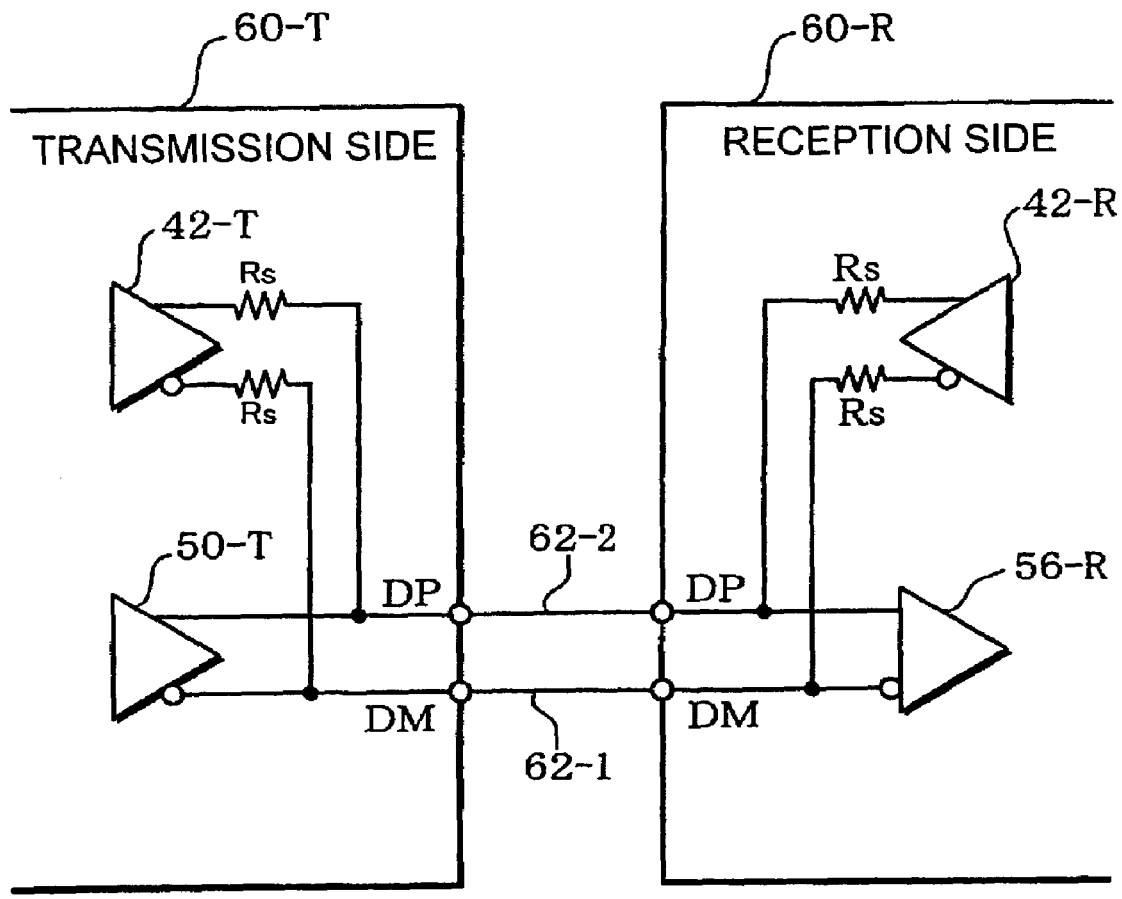
FIG. 7 shows an example of a main part of a transmission/reception system when data transfer is performed in HS mode by using the data transfer control device of the second embodiment.

FIG. 7 shows an example of a main part of a transmission/reception system in the case where data transfer is performed in the HS mode by using the data transfer control device of the second embodiment.

When data is transferred in the HS mode, a transmission side data transfer control device 60-T including the above-described physical layer circuit and a reception side data transfer control device 60-R are coupled through a differential pair of signal lines 62-1 and 62-2 (the first and second signal lines in a broad sense). The transmission and reception signals DP and DM which form the differential pair are transferred through the differential pair of signal lines 62-1 and 62-2.

According to the USB 2.0, the drivers and receivers corresponding to the transfer rates in HS mode and the FS mode are separately provided as described above. Therefore, the drivers and receivers in both modes are commonly coupled to the differential pair of signal lines (the first and second signal lines 62-1 and 62-2).

The analog front-end circuit of the transmission side data transfer control device 60-T at least includes an FS driver 42-T and an HS current driver 50-T. The analog front-end circuit of the reception side data transfer control device 60-R includes at least an FS driver 42-R and an HS differential data receiver 56-R.

The USB 2.0 specifies an output impedance of Z0 (45 $\Omega \pm 10\%$) at the time of data transfer in the HS mode. An unshown terminating resistor (included inside 42-T in the figure) is coupled to each of the first and second signal lines 62-1 and 62-2.

This terminating resistor is coupled to the FS driver. Therefore, when the FS driver drives "0" in the HS mode, this terminating resistor is used as the terminating resistor of the signal lines in the HS mode.

The FS driver 42-T drives "0" to the first and second signal lines 62-1 and 62-2 by, for example, the output control of the FS_OutDis shown in FIG. 6. As a result, the first and second signal lines 62-1 and 62-2 are pulled down through the termination resistor in the transmission side data transfer control device 60-T.

The HS current driver 50-T amplifies the differential pair of the send signals consisting of the HS_DPout and HS_DMout sent from the unshown HS circuit by, for example, the output control using the HS_OutDis and the supply control of the drive current using HS_CurrentSourceEnb shown in FIG. 6.

Meanwhile, the FS driver 42-R drives "0" to the first and second signal lines 62-1 and 62-2 by, for example, the output control using the FS_OutDis shown in FIG. 6. As a result, the first and second signal lines 62-1 and 62-2 are pulled down through the termination resistor in the reception side data transfer control device 60-R.

The HS differential data receiver 56-R amplifies the differential pair of the received signals to the first and second signal lines 62-1 and 62-2 by, for example, the output control using the HS_RxEnb shown in FIG. 6, and outputs the HS_DataIn and the HS_DataIn_L.

As described above, the HS current driver 50-T in the transmission side data transfer control device 60-T current-drives the first and second signal lines 62-1 and 62-2, which are terminated by the termination resistors on the transmission side and the reception side, corresponding to the transmission signal.

FIG. 8A shows a specific configuration example of the FS driver 42-T. An FS transmission driver 212 includes a P-type transistor TPTR1 and an N-type transistor TNTR1 coupled between and in series with power supplies VDD and VSS (the first and second power supplies in a broad sense). The first terminating resistor 160-1 and the fixed resistor Rs-1 are provided between the node TN1 which is an output of the transistors and the node of the DP. A transmission driver 414 includes a P-type transistor TPTR2 and an N-type transistor TNTR2 coupled between and in series with power supplies VDD and VSS. The second terminating resistor 160-2 and the fixed resistor Rs-2 are provided between the node TN2 which are outputs of the transistors and the node of the DM.

A transmission control circuit 422 receives signals DOUT1 and OUTDIS from a coupled circuit, performs a logical operation based on the truth table shown in FIG. 8B and outputs signals OP1 and ON1 to a transmission driver 412. The transmission control circuit 424 receives signals DOUT2 and OUTDIS from a coupled circuit, performs the logical operation based on the truth table shown in FIG. 8B and outputs signals OP2 and ON2 to a transmission driver 414.

Suppose, the OUTIS is in a low level (L level). Then, the DP becomes the low level when the DOUT1 is the low level and the DP becomes a high level (H level) when the DOUT1 is the high level. Also, the DM becomes the low level when the DOUT2 is the low level and the DM becomes the high level when the DOUT2 is the high level. On the other hand, when the OUTIS is in the high level, both DP and DM become a high impedance state.

Here, when the OP1 is the H level and the ON1 is the L level (in other words, the DOUT1 is the L level and the OUTDIS is the L level), the first terminating resistor 160-1 coupled to the signal line of the DP is pulled down to the VSS and terminates the signal line DP in the HS mode.

In the same way, when the OP2 is the H level and the ON2 is the L level (in other words, the DOUT2 is the L level and the OUTDIS is the L level), the second terminating resistor 160-2 coupled to the signal line of the DM is pulled down to the VSS and terminates the signal line DM in the HS mode.

In this way, the fixed resistor can serve as a dumping resistor at the time of a low speed transmission (for example, the FS mode of the USB). At the time of a high speed transmission (for example, the HS mode of the USB), the fixed resistor can serve as the terminating resistor and terminate the first and second signal lines.

4. Data Transfer Control Device

Figure 9:
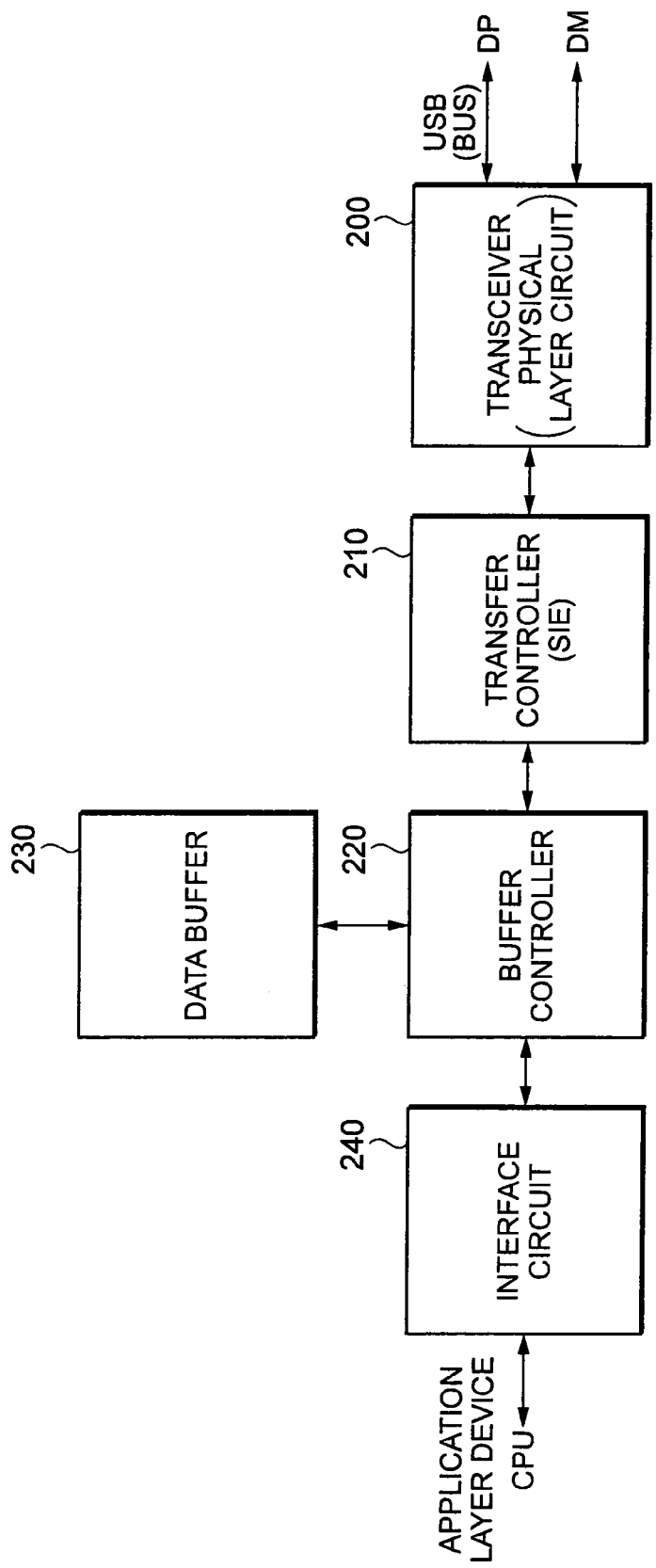
FIG. 9 shows a structure of the data transfer control device according to the embodiment.

FIG. 9 shows a structure of the data transfer control device according to the embodiment.

The data transfer control device of this embodiment includes a transceiver 200, a transfer controller 210, a buffer controller 220, a data buffer 230 and an interface circuit 240. Some of these circuit blocks may be omitted and connection conditions among these circuit blocks may be changed.

The transceiver 200 is a circuit to send and receive data by using the differential signals (differential data signals) DP and DM. The transceiver 200 may include, for example, the physical layer circuit (an analog front-end circuit) of the USB (a given interface standard in a broad sense). The transceiver 200 may include circuits in other layers than the physical layer.

The transfer controller 210 is a controller for controlling the data transfer through the USB and realizes a function of the serial interface engine (SIE) and the like. For example, the transfer controller 210 conducts a packet handle process, a suspend & resume control, a transaction management and the like.

The buffer controller 220 secures a storage area (an endpoint area and the like) in the data buffer 230 and controls access to the storage area in the data buffer 230. More particularly, the buffer controller 220 controls access from a device in an application layer through the interface circuit 240, access from the CPU through the interface circuit 240 and access from the USB (the transfer controller 210) or adjusts these accesses. The buffer controller 220 also forms and manages access addresses.

The data buffer 230 (a packet buffer) is a buffer (FIFO) for temporally storing (buffering) a transferred data (send data or receive data) through the USB. This data buffer 230 may consist of memories such as RAM.

The interface circuit 240 is a circuit to realize a direct memory access (DMA) bus to which the application layer device is coupled and an interface to which the CPU is coupled through a CPU bus. This interface circuit 240 may include a DMA handler circuit for a DMA transfer and the like.

The transceiver 200 includes the above-described components with reference to FIGS. 1 though 8.

Figure 10:
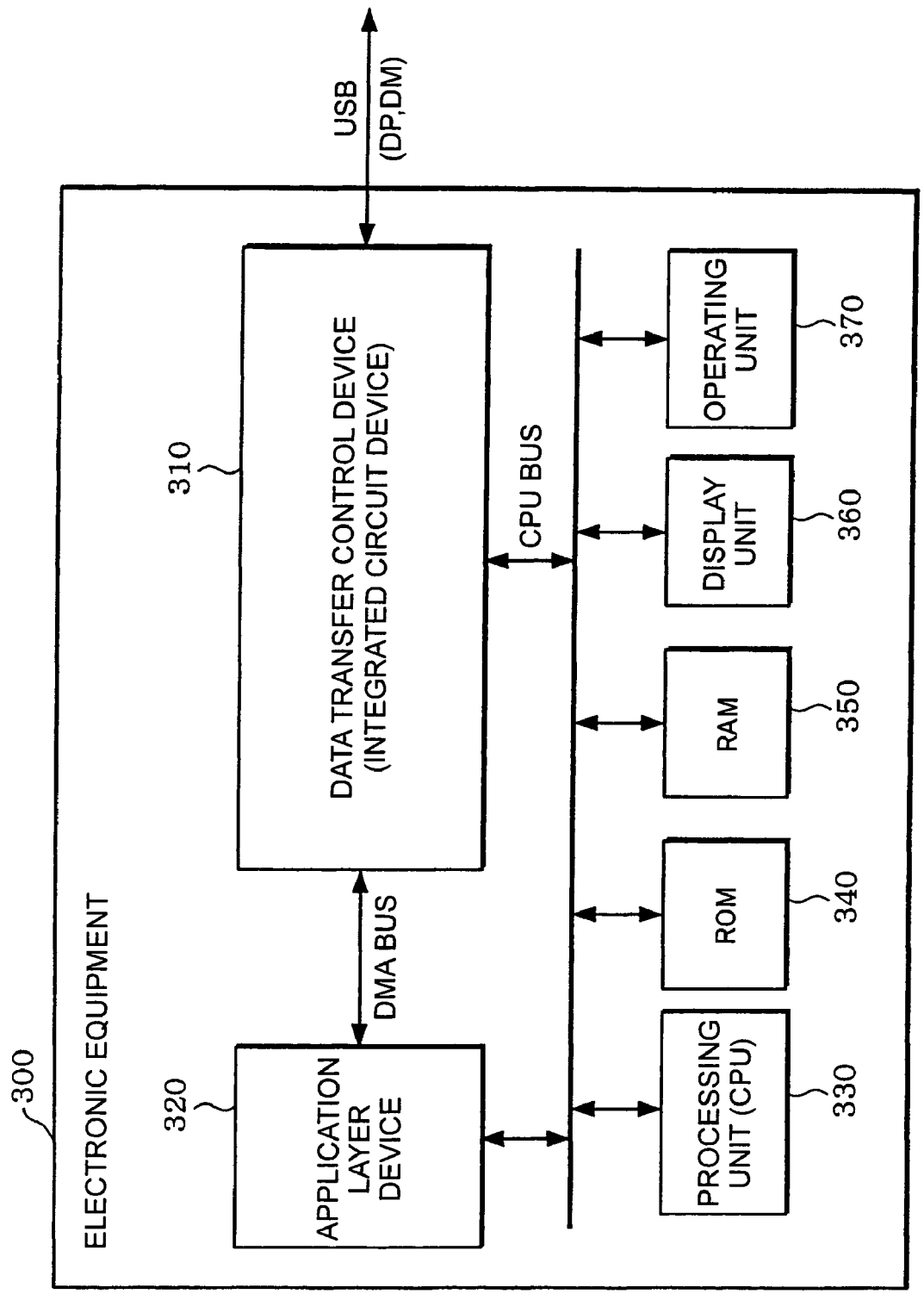
FIG. 10 shows electronic equipment of the embodiment.

FIG. 10 shows electronic equipment of the present embodiment.

This electronic equipment 300 includes a data transfer control device 310 (integrated circuit device) which have described above, an application layer device 320 consists of application specific integrated circuits (ASIC) and the like, a CPU 330, a ROM 340, a RAM 350, a display unit 360 and an operating unit 370. Some of these circuit blocks may be omitted.

Here, the application layer device 320 can be, for example, a device for realizing an application engine of a cellular phone, a device for controlling a drive of an information storage medium (a hard disk and an optical disk), a device for controlling a printer, an MPEG encoder, an MPEG decoder and the like. The processing unit (CPU) 330 controls the data transfer control device 310 and the entire electric equipment. The ROM 340 stores a control program and other data. The RAM 350 serves as a work area and a data storage area for the processing unit 330 and the data transfer control device 310. The display unit 360 displays various kinds of information to users. The operating unit 370 is a part for the user to control the electronic equipment.

Though the DMA bus and the CPU bus are separated in FIG. 10, these may be put together. Furthermore, a processing unit for controlling the data transfer control device 310 and another processing unit for controlling the electronic equipment may be separately provided. As the electronic equipment to which the embodiments of the present invention can be applied, cellular phones, optical disk drives (CD-ROM and DVD), magneto-optical disk drives (MO), hard disk drives, TVs, TV tuners, VTRs, video cameras, audio equipment, projectors, personal computers, electronic notebooks, word processors, and the like can be given.

The present invention is not limited to the above-described embodiments. Various modifications and variations are possible within the spirit and scope of the present invention.

For example, words used in the specification and the figures may be replaced by comprehensive or synonymous terms and words used in other section of the specification and the figures.

In the above-described embodiments, the case in which the three resistors are coupled in parallel and form the variable resistor is explained. However, the case is not limited to this. The variable resistor may be formed of two or more than three resistors coupled in parallel.

Moreover, in the above-described embodiments, the case in which the resistors that form the variable resistor are the NMOS transistors and three, five or twelve of them coupled in parallel are provided is described. However, the case is not limited to this. The transistor elements may be provided in other number and coupled in parallel.

The data transfer control device according to the present embodiment is not limited to the structure shown in FIG. 6 but various modifications and variations are possible.

The transmission circuit to the present embodiment is not limited to the structures described with reference to FIGS. 1 though 8 but various modifications and variations are possible.

What is claimed is:

1. A transmission circuit transmitting a signal through first and second signal lines that form a differential pair, comprising:
   a current source coupled between a first power supply and a node;
   a first switching element inserted between the node and the first signal line;
   a second switching element inserted between the node and the second signal line;
   a circuit driving the first signal line or the second signal line through either the first switching element or the second switching element with a current provided from the current source;
   a first terminating resistor terminating the first signal line;
   a second terminating resistor terminating the second signal line; and
   a terminating resistance control circuit generating a control signal for controlling terminating resistance values of the first terminating resistor and the second terminating resistor, wherein the first terminating resistor and the second terminating resistor respectively have a variable resistor including first-nth resistors coupled each other, the first resistor takes a first resistance value if a first control signal is active, the nth resistor takes a nth resistance value if a nth control signal is active, one end of the coupled first-nth resistors is coupled to a reference potential, the other end of the coupled first-nth resistors is coupled to the first signal line or the second signal line and the terminating resistance control circuit generates the first to nth control signals based on a terminating resistance configuration information.

2. The transmission circuit according to claim 1, further comprising:
   a first fixed resistor coupled in series with the first terminating resistor and terminating the first signal line; and
   a second fixed resistor coupled in series with the second terminating resistor and terminating the second signal line.

3. The transmission circuit according to claim 1, wherein, the first to nth resistors forming the variable resistor respectively include a one or more than one N-type MOS transistor elements that are couple in parallel, and control signals corresponding to first to nth control signals are correspondingly coupled to gates of the N-type MOS transistor elements in the first-nth resistors.

4. The transmission circuit according to claim 1, further comprising:
   a low speed transmission circuit including a first driver driving the first signal line and a second driver driving the second signal line, wherein the first fixed resistor is provided between the first driver and the first signal line, the second fixed resistor is provided between the second driver and the second signal line, and outputs of the first driver and the second driver are fixed to a first level in a case of a fast transmission.

5. The transmission circuit according to claim 1, wherein the terminating resistance control circuit includes a terminating resistance setting information register storing the terminating resistance information that is possible to be set by an external input.

6. The transmission circuit according to claim 1, wherein the signal transmitted through the first and second signal lines forming the differential pair is a signal specified in Universal-Serial-Bus standard.

7. A data transfer control device, comprising:
   a circuit conducting a predetermined transmission process; and
   the transmission circuit according to claim 1 transmitting a signal based on the predetermined transmission process.

8. An electronic equipment, comprising:
   the data transfer control device according to claim 1; and
   a device performing an output process, a loading process and a storing process of data that is transferred through a bus and the data transfer control device.

* * * * *